(12) United States Patent
Rayramesh (10) Patent No.: US 11,680,704 B2
(45) Date of Patent: Jun. 20, 2023

(54) HIGH-EFFICIENCY TWO-CHAMBER BOILER USING TURBULENT REVERSE FLOW OF COMBUSTION GASES

(71) Applicant: Hossein Rayramesh, Toronto (CA)

(72) Inventor: Hossein Rayramesh, Toronto (CA)

(*) Notice: Subject to any disclaimer, the term of this patent is extended or adjusted under 35 U.S.C. 154(b) by 0 days.

(21) Appl. No.: 17/243,717

(22) Filed: Apr. 29, 2021

(65) Prior Publication Data

US 2022/0349570 A1    Nov. 3, 2022

(51) Int. Cl.
| | |
|---|---|
| *F22B 21/28* | (2006.01) |
| *F22B 1/18* | (2006.01) |
| *F22B 21/26* | (2006.01) |
| *F22B 27/04* | (2006.01) |
| *F22B 27/08* | (2006.01) |
| *F22B 27/10* | (2006.01) |

(52) U.S. Cl.
CPC ............ *F22B 21/28* (2013.01); *F22B 1/1884* (2013.01); *F22B 21/26* (2013.01); *F22B 27/04* (2013.01); *F22B 27/08* (2013.01); *F22B 27/10* (2013.01); *Y02B 30/00* (2013.01)

(58) Field of Classification Search
CPC ........ F22B 21/26; F22B 21/28; F22B 1/1884; F22B 27/04; F22B 27/08; F22B 27/10; Y02B 30/00

USPC ......................................................... 122/249
See application file for complete search history.

(56) References Cited

U.S. PATENT DOCUMENTS

| | | | | |
|---|---|---|---|---|
| 1,609,661 | A | * 12/1926 | Quinn ..................... | F22B 27/10 122/250 R |
| 3,212,571 | A | * 10/1965 | Romanos ................. | F28D 7/04 165/163 |
| 2007/0042300 | A1 | * 2/2007 | Movassaghi ............. | F23M 5/08 431/1 |
| 2007/0209606 | A1 | * 9/2007 | Hamada .................... | F28F 1/02 122/18.1 |
| 2011/0155079 | A1 | * 6/2011 | Matsunaga ........... | F28D 7/0075 122/15.1 |

* cited by examiner

Primary Examiner — Steven B McAllister
Assistant Examiner — Benjamin W Johnson
(74) Attorney, Agent, or Firm — Elias Borges (57) ABSTRACT

A novel two-chamber design for thermal boilers is presented in this document. The boiler uses spiral-shaped tubes with conical and flat portions which form a combustion chamber. The use of a direct flame burner causes exhaust gas turbulence and increases the gas pressure in the main chamber. The high-pressure gases, which have lost their kinetic energy due to collision with spirals, leave the main chamber and enter into the secondary chamber, where their energy is used to preheat inlet water. The control of distance between spirals, the reverse flow of exhaust gases in the chambers, and the specific geometry of the spirals maximize boiler efficiency,

11 Claims, 6 Drawing Sheets

HIGH-EFFICIENCY TWO-CHAMBER BOILER USING TURBULENT REVERSE FLOW OF COMBUSTION GASES

FIELD OF THE INVENTION

The invention relates to thermal boilers.

BACKGROUND ART

Thermal boilers are pressure vessels containing some parallel blades, which warm up or transform water into steam. The boilers come in various shapes and sizes based on their capacity ranging from 10,000 to 500,000 kcal/hr. These boilers are used to generate hot water in low pressure systems with a maximum of 5 bar pressure such as domestic and light industrial applications. The thermal efficiency of the boilers is about 60% for solid fuels and 70% for fluid or gas fuels. The first generation of hot-water boilers was made using cast-iron blades and has been marketed for several years. However, due to the low efficiency and problems mentioned in the previous section, the boilers were rendered obsolete in developed countries. In an attempt to improve the efficiency of the boilers, pressurized steel boilers and multi-pass pressurized steel boilers were then suggested. These boilers, also known as traditional boilers, did not develop further. As the development progressed, the use of condensation technology, in which a condenser is employed to absorb latent heat from combustion products, was highly regarded. This approach resulted in a significant increase in boiler efficiency. Condensing boilers are usually built with aluminum-silicon and stainless steel alloys. Because of the high cost, low heat transfer coefficient, and high weight of stainless steel, aluminum-silicon boilers received more attention. These boilers, however, have a number of disadvantages such as low nominal capacity (up to 1.6 million calories), limited working pressure (up to 6 bar), application of expensive premix burners, and low resistance against acid condensation. The following problems are identified in using the boilers:

Low efficiency: A variety of parameters including exit-gas temperature, gas recirculation times, heat surface area, excess air, fuel composition, ambient temperature, and boiler/burner compatibility affect boiler efficiency. Lack of a well-controlled system results in a waste of exhaust gas energy, and the rise in the temperature of exhaust gases up to 300° C.—thereby reducing the thermal efficiency of the boilers.

Limited heat capacity: The design of traditional boilers using parallel cast-iron blades is such that more blades are required to increase the heat capacity of the boilers. On the other hand, increasing the number of blades results in thermal heterogeneity in the first and last blades, which causes high temperature gradients and thermal shocks in the blades.

Environmental pollution: An improper fuel-air mixture in traditional boilers produces hazardous greenhouse gases such as CO and NOx, which causes air pollution. In addition, traditional boilers are not able to use the exhaust gases. Consequently, these emissions exceed the standard limit and intensify environmental degradation.

Restrictions on fluid working pressure: Maximum fluid working pressure for a boiler depends on the boiler's nominal capacity and inlet flow-rate. The higher-capacity boiler is, the more flowrate and consequently more pressure it requires. Due to the specific design of blades—i.e., low thickness to boost heat transfer—the maximum nominal pressure in traditional boilers cannot be more than about 6 bar, which is a potential problem for the production of high-capacity boilers.

Sediments: The water used in the boilers is composed of various soluble and insoluble materials that could settle in the boiler tubes and cause a number of problems such as walls corrosion, energy losses, and boiler perforations. Depending on material, thickness, and heat transfer coefficient of the sediments, the deposition of these particles in the watercourse reduces the heat transfer rate and boiler efficiency. Lack of proper heat transfer in the pipes of the boiler increases the operating temperature of blades, and consequently reduces the blades' service life. Removal of sediments from boiler components is an expensive process especially in the case of hard sediments.

Product development challenges: The four stages of a technology lifecycle include research and development, ascent, maturity, and decline (or decay). In the decline phase, financial profits from selling the product start dipping, and customers turn to buy other products. As a solution, producers could benefit from utilizing inexpensive production methods or targeting other markets. After the decay phase, there are usually two methods to return the product to competitive markets; (1) product development exploiting new knowledge and technologies, (2) design of new high-quality products that can be developed. Traditional boilers have reached a dead end in terms of research and development, and hence a new technology is required to boost the quality of the equipment.

Application of expensive burners: As the traditional boilers evolve, some modifications have been made to the previous generation to increase their efficiency. The alterations include the incorporation of a condenser into the traditional boilers to absorb heat from combustion products and warm up boiler inlet water to increase boiler efficiency. These boilers, known as condensing boilers, use very expensive premix burners,

Low Corrosion/Oxidation Resistance:

(a) Corrosion of Internal Surfaces affected by Flammable Gas. This includes:
- Low-temperature corrosion: This corrosion occurs during boiler shutdown when exhaust gas temperature reaches below the dew point and is often associated with dew point corrosion.
- High-temperature corrosion: This corrosion occurs due to the presence of corrosive gases in combustion products.

(b) Corrosion of External Surfaces
- Oxygen corrosion: Insoluble oxygen in the feed water causes pitting corrosion.
- Hydrogen diffusion: Hydrogen diffuses in steel grains and reacts with carbon, which causes a transgranular fracture.

An improved boiler design which overcomes the limitations listed above but which is also inexpensive to build is therefore required.

SUMMARY OF THE PRESENT INVENTION

The present invention is directed at a high-efficiency boiler which utilizes high pressure turbulent flow in a combustion chamber to extend heat exchange between the combustion gasses and the fluid being heated. The boiler includes a housing having first and second chambers separated by a wall. The first chamber houses a set of at least four parallel spiral-shaped tubes made of stainless steel, the four spiral-shaped tubes including first and second outer spiral-shaped tubes and a pair of inner spiral-shaped tubes positioned between the first and second outer spiral-shaped tubes. The first and second outer spiral-shaped tubes each having a conical portion, the conical portion of the first and second spiral-shaped tubes forming a combustion chamber. The boiler further includes a second chamber housing a set of at least four parallel spiral-shaped tubes made of stainless steel. The first and second chambers are in communication by a conduit passing between the first and second chambers allowing exhaust gas to flow from the first chamber to the second chamber.

BRIEF DESCRIPTION OF DRAWINGS

In the drawings like characters of reference indicate corresponding parts in the different figures.

DETAILED DESCRIPTION OF THE PREFERRED EMBODIMENT

Figure 1:
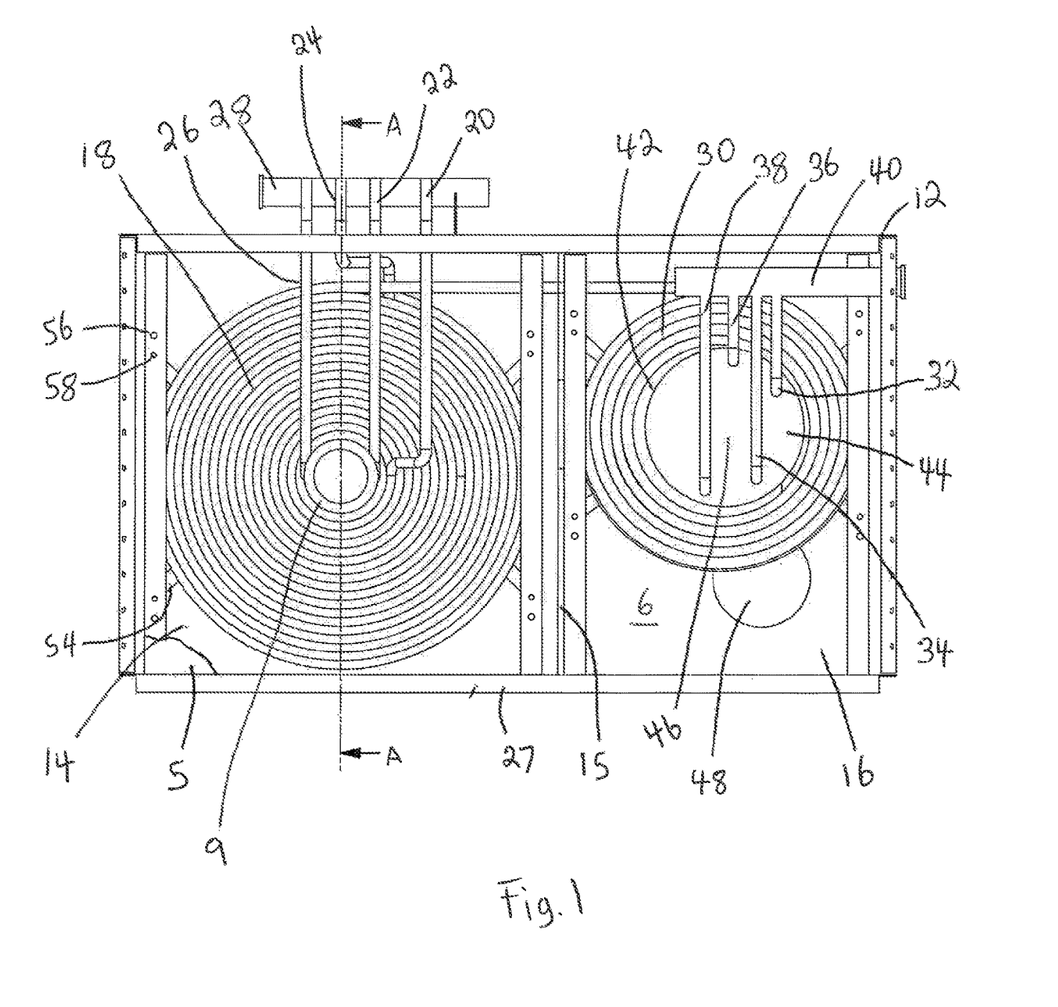
FIG. 1 is a right-side view of a boiler made accordance with the present invention.

Referring firstly to FIG. 1, a boiler made in accordance with the present invention is shown generally as item 10 and consists of a housing 12 having a main chamber 14 and a secondary chamber 16 divided by wall 15. Housing 12 will have outer walls 5 and 6 which enclose chambers 14 and 16 and keep them isolated from the surrounding air. For the purposes of illustration, wall 5 has been mostly removed in order to better illustrate the inner workings of the boiler. The two-chamber boiler is substantially air-tight and separating wall 15 which is connected to the housing 12 separates the main chamber from the secondary chamber preventing gas from flowing between the chambers except via an interconnecting conduit as more particularly described below. The left chamber (main chamber 14) houses a combustion chamber and the right chamber (secondary chamber 16) acts as a condensing chamber as more particularly described below. Main chamber 14 houses a first series of spiral-shaped tubes 18, which in the preferred embodiment shown, consist of four spiral-shaped tubes 20, 22, 24 and 26 which couple to header 28. Secondary chamber 16 houses a second series of spiral-shaped tubes 30, which in the preferred embodiment shown, consist of four spiral-shaped tubes 32, 34, 36 and 38 which couple to header 40. Spiral-shaped tubes 20, 22, 24 and 26 are continuous with spiral-shaped tubes 32, 34, 36 and 38.

A hub 9 is formed on the first series of spiral-shaped tubes 18. Hub 9 is configured to receive the nozzle of a gas or oil burner and the first series of spiral-shaped tubes effectively forms a combustion chamber for receiving the burning gas or oil from hub 9. A hub 42 is likewise formed by second series of spiral-shaped tubes 30, which is blocked off from the rest of second chamber 16 by wall 44 to form an inner chamber 46. As will be further discussed below, heated combustion gases make their way between the first series of spiral-shaped tubes and into first chamber 14 where they pass through a conduit to inner chamber 46. As will be further discussed below, combustion gases make their way between the second series of spiral-shaped tubes and into second chamber 16 where they eventually exhaust out of the boiler through exhaust port 48.

Header 40 acts as an intake header supplying the spiral-shaped tubes with ambient water, and header 28 acts an output header draining heated water from the spiral-shaped tubes. The spiral-shaped tubes are preferably made from 316L stainless steel, although the spiral-shaped tubes may be made of any suitable metal which may be used for boiler applications. Wall 44 is preferably made from 310 stainless steel, but any metal suitable for use in gas/oil fired boilers may be used.

There are several clamps (e.g., 54) welded to the spirals. These clamps have holes for two purposes: holes in which retainers (e.g., 56) insert, and holes through which screws (e.g., 58) pass. Retainers are fixed into the holes to bear the weight of the spirals and keep them upright. These retainers are mounted on some legs (e.g., 60 and 62 in FIG. 2). Adjusting the distance between the spirals is achieved by the screws that pass the threaded holes of the clamps.

Main Chamber

Figure 2:
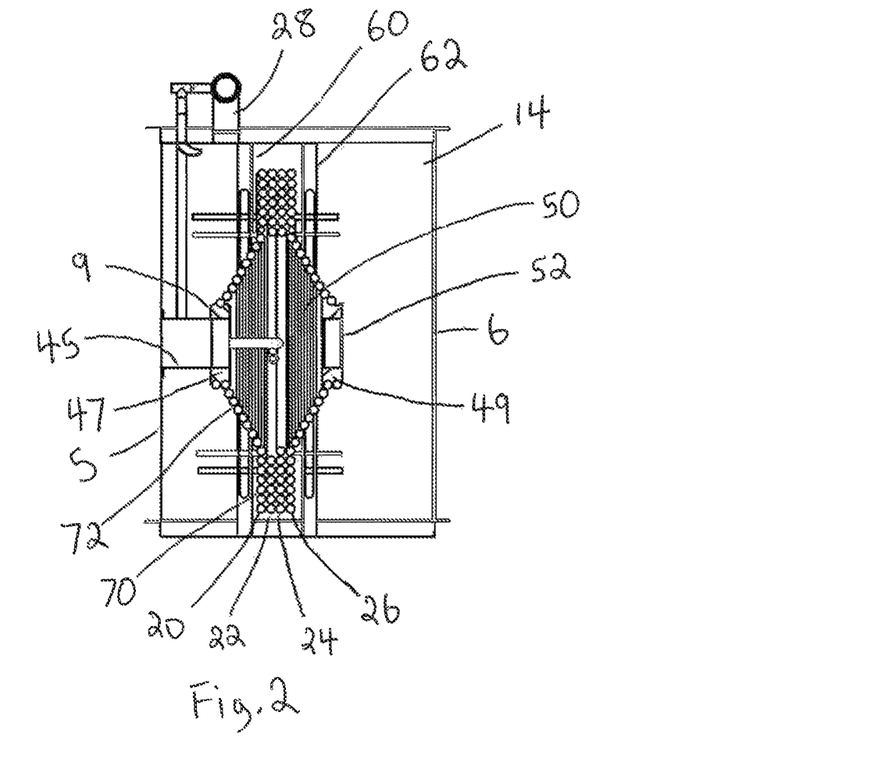
FIG. 2 is a sectional view of the boiler shown in FIG. 1 and taken along line A-A in FIG. 1.
Figure 3:
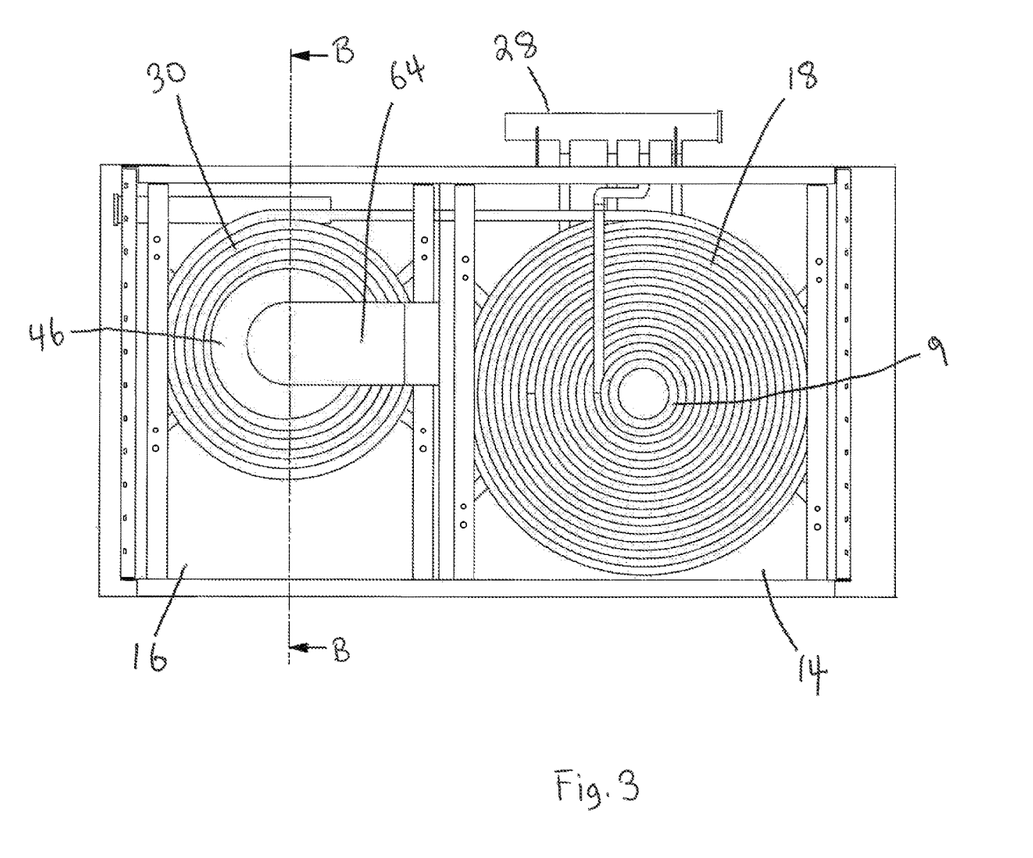
FIG. 3 is a left-side view of the boiler shown in FIG. 1.

Referring now to FIG. 2, the main chamber 14 contains four SS316L spirals 20, 22, 24 and 26 which are separated by a distance D from each other. The outer spirals 20 and 26 are conical in shape, while the inner spirals 22 and 24 have a flat configuration. Hub 9 is formed from metal collars 47 and 49 coupled to outer spirals 20 and 26, respectively. A spacer tube 45 is mounted to collar 47 and is dimensioned to receive the nozzle of a gas/oil burner. Outer spirals 20 and 26 as well as inner spirals 22 and 24 form a combustion chamber 50 which receives combusting gas/oil from the burner nozzle received by spacer tube 45. Metal collars 47 and 49 serves three primary goals. First, a side surface of the collars have a helical groove that gives a taper shape to the outer spirals. Second, collar 47 have two holes by which the hot water of the confined spirals is transferred to the exit header 28. The hot water from outer spirals are directly transferred to the exit header 28 via vertical pipes (extensions of the spiral-shaped tubes); however, due to space limitation, the hot water from the internal spirals are taken out using the holes created in the collar. Third, to use the effective length of the flame produced by the burner, spacer tube 45 is mounted on hub 9 so as to push the burner nozzle back and produce enough space within combustion chamber 50 for the flame. The space created at the center of the spirals is a cylindrical volume which forms combustion chamber 50. Plate 52, which is preferably made of SS 310, is welded to the end of collar 49, so as to close off combustion chamber 50. The flame tip spreads in the combustion chamber after hitting plate 52. As best seen in FIG. 3, conduit 64 permits the hot exhaust gases to pass from the main chamber 14 into inner chamber 46 formed by spiral-tubes 30 in secondary chamber 16. These hot gasses are utilized for preheating inlet feed water circulating in the secondary series of spiral-tubes 30.

Secondary Chamber

Figure 4:
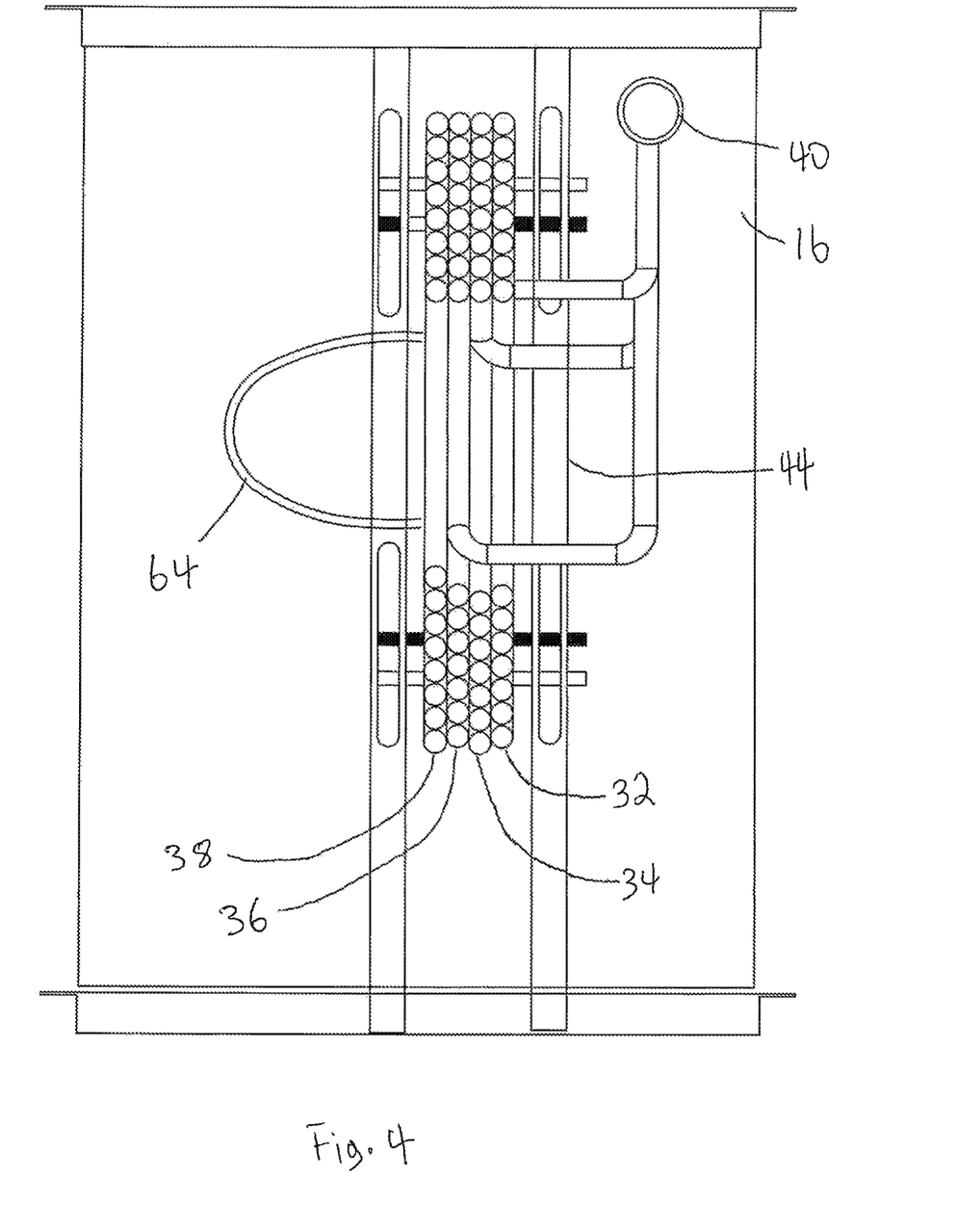
FIG. 4 is a sectional view of the boiler shown in FIG. 3 and taken along line B-B in FIG. 3.
Figure 5:
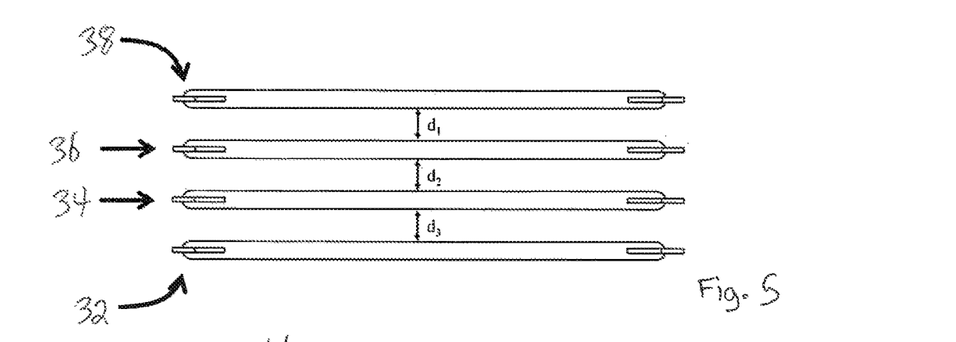
FIG. 5 is a top view of the spiral-shaped tubes formed in the second chamber of the boiler shown in FIG. 1.
Figure 9:
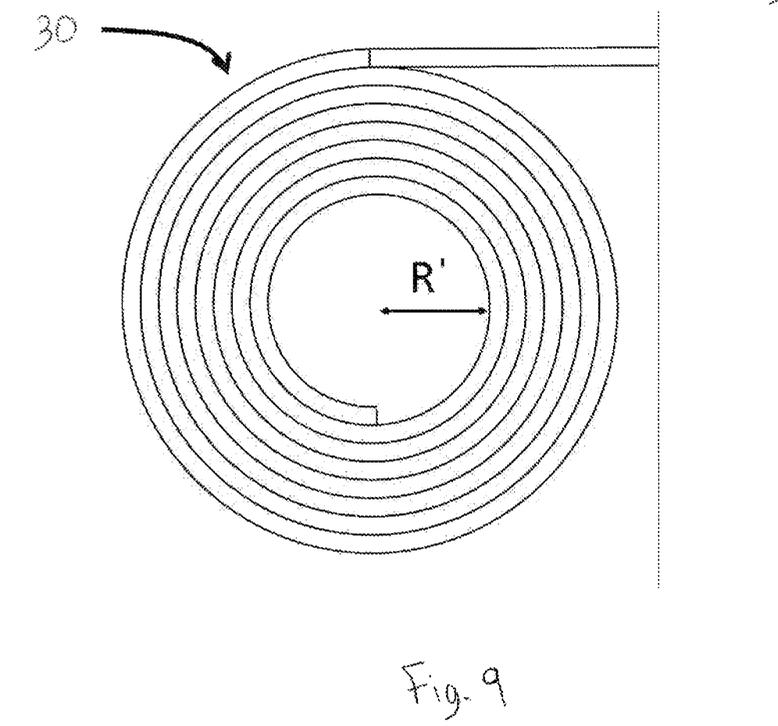
FIG. 9 is a side view of the spiral-shaped tube portions in the second chamber of the boiler shown in FIG. 1.

FIG. 4 is a section view illustrating the secondary chamber 16 in more detail. In the secondary chamber 16, there is a set of four flat spiral-shaped tubes 32, 34, 36 and 38 made of stainless steel. These spirals have a distance d1, d2 and d3 from each other (see FIG. 5). To adjust the distance of the spiral-shaped tubes and maintain their weight in the secondary chamber, a system similar to the one used in the main chamber is employed. Each spiral-shaped tube is connected to the inlet water collector 40 using a stainless steel knee. A circular SS310 plate 44 is welded to the outer spiral-shaped tube to prevent waste of heat transferred to the secondary chamber from the main one. As seen in FIG. 9, the spiral shaped tubes 30 in the secondary chamber have an internal diameter R'.

Water Path and Flow of Combustion Gasses

Figure 6:
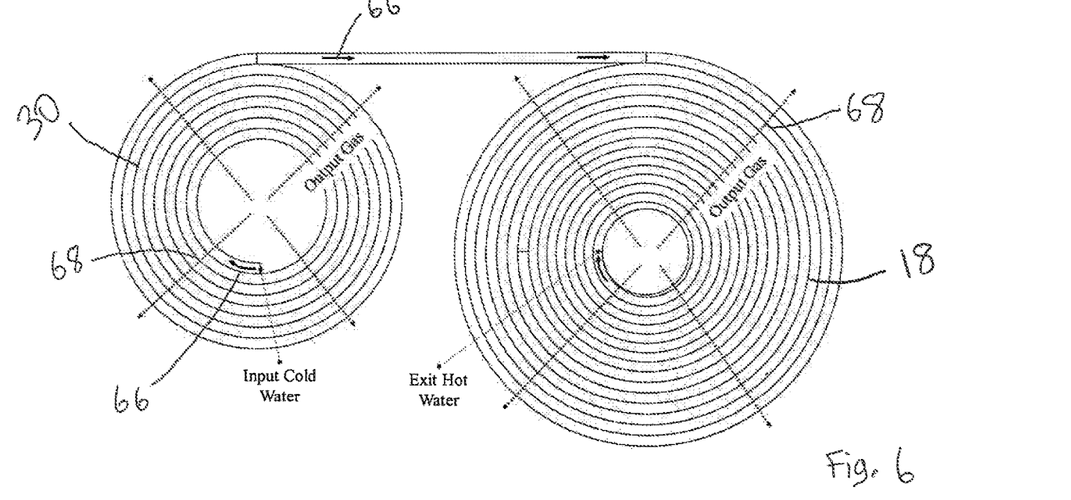
FIG. 6 is a schematic view of the circulation path through both the first and second chambers of the boiler shown in FIG. 1.

Referring now to FIG. 6, water from the inlet collector enters the secondary spirals 30 from their inner radius, then moves toward first spirals 18 installed in the main chamber, therein it exits from the inner radius to reach the output collector. The illustration of water flow is indicated by arrows 66. Water flow in the spirals of the secondary chamber is outward, whereas it is inward in the spirals of the main chamber. The flow of hot combustion gasses is indicated by arrows 68.

Geometric Features of the Spirals

Figure 7:
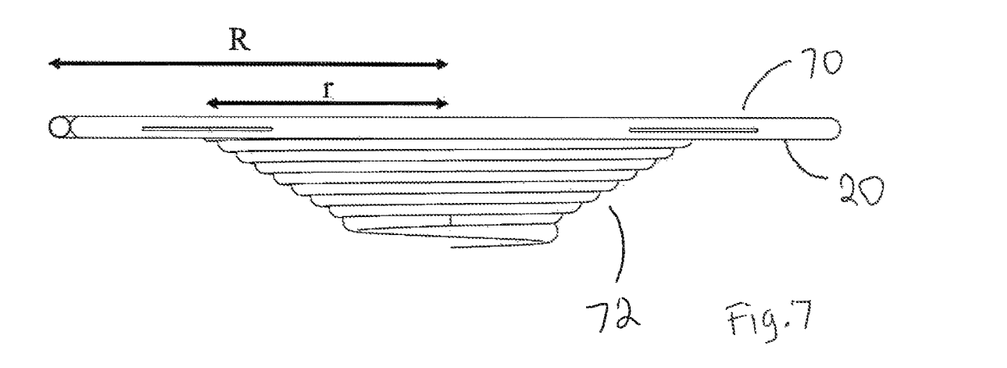
FIG. 7 is a view of one of the outer spiral-shaped tube portions of the boiler shown in FIG. 1.

Referring now to FIG. 7, the geometry of the outer spiral-shaped tubes 20 and 26 define the shape of the combustion chamber and is of vital importance in the turbulence of the combustion products. For the purposes of this discussion, reference will be made to spiral-shaped tube 20, but it is to be understood that the same points apply to spiral-shaped tube 26. Spiral-shaped tube 20 has a flat outer portion 70 and a conical inner portion 72. "R" is defined as the radial distance (radius) of spiral-shaped tube 20, and "r" is defined as the radial distance of conical portion 72 as shown in FIG. 7. The ratio r/R is important in controlling the turbulence of the combustion gases, and therefore, the efficiency of the boiler. The smaller the ratio, the greater the gas turbulence and the higher the efficiency of the boiler. The optimal ratio is achieved when it does not result in high thermal and compressive shocks. It has been discovered that ratios of r/R in the range of about ½ provide excellent performance. In addition to the r/R ratio being suitable, volume of the combustion chamber should be appropriate for the flame from the oil/gas burner. The r/R ratio can be selected for boilers with different heat capacities and is directly related to the flame volume. This ratio plays a critical role in creating a complete burning.

Figure 8:
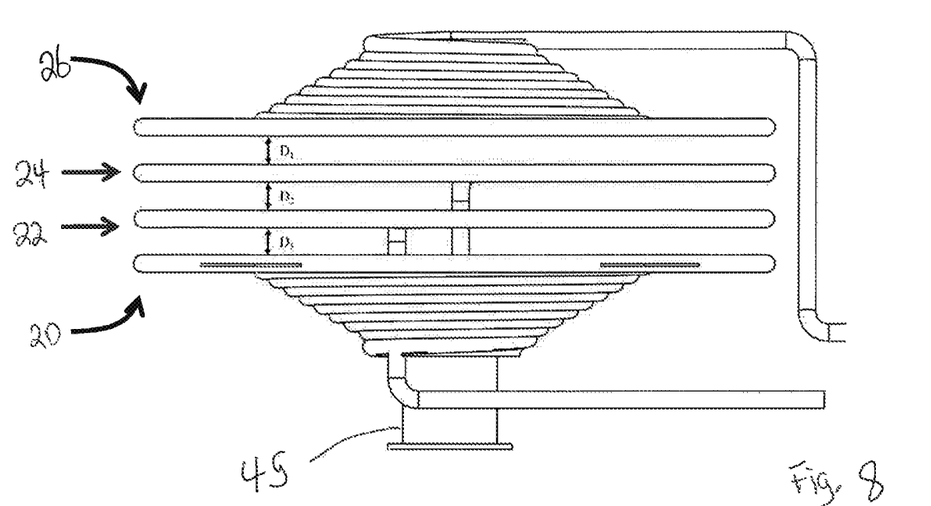
FIG. 8 is a top view of the spiral-shaped tube portions in the first chamber of the boiler shown in FIG. 1.

Referring now to FIG. 8, another factor contributing to the complete burning is the distance between the spiral-shaped tubes 20, 22, 24 and 26, which is shown as D1, D2, and D3. Distance D controls the pressure inside the combustion chamber. By increasing the distance, the internal pressure of the combustion chamber decreases. The use of an optimum spacing could increase the internal pressure of the chamber, as well as the collision and turbulence of the combustion products. Thus, the kinetic energy and flowrate of the exhaust gases reduce, which gives them enough time for heat exchange upon crossing thermal passages. As the combustion chamber pressure increases, some hot gases that are not allowed to exit thermal passages come back to the chamber center with their high pressure. The high temperature of these gases contributes to creating a complete combustion. As a result, thermal efficiency improves, and air pollutant emissions such as CO and NOx are reduced.

Referring back to FIG. 1, the combustion products, which contain acidic gases and water vapor, are continuously evacuated from the main chamber and inserted into the secondary chamber through the conduit. The secondary chamber, which preheats inlet water, receives energy from these combustion products. Consequently, an acidic film with a PH of 3 through 5 is left, which flows into the tray 27 embedded below the boiler. The design of the condensing chamber is such that the flammable gases lose their energy in a new pass, and the water vapor in the products—together with some acidic gases—is condensed by contacting with the cold pipes. The cooled gases, with very low pollution, are then released from the exhaust 48.

In the design of the condensing chamber, optimal values of the inner radius R' of the second series of spiral-shaped tubes 30 (see FIG. 9) and the distance "d" between the spiral-shaped tubes 32, 34, 36 and 38 (see FIG. 5) are required to provide the ideal condition for turbulence, prevention of main chamber pressure drop, prevention of the return of flammable gases from condensing chamber to the main chamber, maximum heat transfer, and maximum condensing. An important feature of the boiler is the concurrent flow of the fluids, which increases the thermal efficiency of the system. The cold water flows outward from the center. Due to the contact of hot exhaust gases with cold inlet water at the center, significant energy exchange occurs in this region, which causes an increase and decrease in inlet water and exhaust gases temperature, respectively.

The objective of this invention was to design and manufacture a novel boiler that could solve the problems of previous generation. The boiler, with its new capabilities, was designed to fulfill the needs of various industries. A high-pressure turbulent flow in the combustion chamber was used to stabilize the combustion, reduce the kinetic energy and the flow rate of combustion products, and extend heat exchange time between water in the spirals and combustion gases. It is important to say that the combustion in the chamber was achieved by the use of an inexpensive direct burner. A gas-condensing chamber was also used to receive residual energy of ignition gases. Due to the low energy and flowrate of exhaust gases, the chamber was designed to provide the most exposure between exhaust gases and water transmission pipes, thereby intensifying energy exchange between them. In the condensing chamber, the exhaust gases flow against the water flow, which is a critical factor in increasing the efficiency of the machine up to 106%.

In water heating boilers, the larger the nominal capacity of the boiler is, the higher the operating pressure of the boiler would be. At high capacities, boilers must withstand high pressures safely. The use of pipes with high pressure tolerance of up to 60 bar, as well as the specific way of connecting and securing the spirals, result in a growth in nominal capacity of the suggested boiler up to 10 million kcal.

Well-controlled combustion process is one of the most important features of the fabricated boiler. Incomplete burning of combustible materials causes air pollution through the emission of excessive greenhouse gases such as CO and NOx that severely damage the ozone layer and the environment. By controlling the combustion process using thermodynamics relations, the unbalanced production of these gases exceeding standard values could be avoided. The combustion process is accomplished by employing a burner in a chamber, where the distance between the spirals is adjustable to increase the space required for the complete burning of combustible materials.

The turbulence of combustion gases produces local vibrations in the spirals, and consequently prevents the sediments from settling and adhering to the pipe wall. According to the Navier-Stokes and Reynolds equations, these vibrations alter water flow to a permissible level, resulting in flow separation and sediment deposition prevention. As a result of the reduction of sediments which cause corrosion, the service life of the pipes increases. In order to boost the life of the boiler, appropriate materials to the working environment were used in the manufacturing of the tubes and other boiler components. For instance, the tubes are made of stainless steel (SS316L), which has excellent corrosion resistance and high ductility needed for forming low diameter spirals. This material selection method extends the boiler's life by up to 40 years.

Advantageous Effects of Invention

The present invention has a plurality of advantages over previous boiler designs, including:

High efficiency: The efficient design of the chambers, which allows maximum heat transfer between water and combustion products, enhances the efficiency up to 106%.

Economical design: Despite the use of stainless steel in boiler structure and spiral-shaped tubes, the specific design of the boiler (optimal use of combustion, control of turbulence and gas pressure) has significantly reduced pipe and material requirements. The equipment is symmetrical in size and weight and has a price equivalent to one-third of boilers made of aluminum-silicon.

Inexpensive burner: The use of cheaper direct flame burner instead of expensive premix burner is one of the most important properties of this work.

High service life: The use of SS316L in the spirals of the boiler increases its resistance to acid and heat, which extends the boiler's service life to 40 years. Therefore, its longevity is promoted unlike the conventional aluminum-silicon boilers that have a lifespan of 15 years.

No need to remove sediments: The turbulence in the gas flow, and the respective vibration in the tubes, prevent sediments from settling, which makes the boiler last longer without the need to repair.

Higher working pressure and heat capacity: Conventional boilers were able to withstand the pressure of up to 6 bar and produce heat capacity of 1,500,000 kcal or at best 2,500,000 kcal. In the new boiler, the heat capacity is increased to 10,000,000 kcal. Also, due to the use of seamless pipes and the correct welding method according to WPS, the tubes can tolerate the pressure of up to 60 bar. Tungsten Inert Gas (TIG) technique was exploited for joining tubes.

Low pollution: Due to the optimization of the combustion process, which results in the complete burning of flammable materials, the new boiler is much less polluting than other boilers.

Development feasibility: The new boiler can be upgraded through development plans, such as removal of the chimney from the boiler, or automating the adjustment of spiral distance to create an ideal ignition space.

This invention is not limited to the aforementioned descriptions. One who is expert in the field appreciates that many alterations and modifications without departing the spirit of this invention are possible.

What is claimed is:

1. A high-efficiency boiler comprising:
   a. a housing having first and second chambers separated by a wall;
   b. the first chamber housing a first set of at least four parallel spiral-shaped tubes made of stainless steel, the four spiral-shaped tubes comprising first and second outer spiral-shaped tubes and a pair of inner spiral-shaped tubes positioned between the first and second outer spiral-shaped tubes, the first and second outer spiral-shaped tubes each having a conical portion, the conical portion of the first and second spiral-shaped tubes forming a combustion chamber;
   c. the second chamber housing a second set of at least four parallel spiral-shaped tubes made of stainless steel that are fluidly coupled with the first set of at least four parallel spiral-shaped tubes, and
   d. the first and second chambers being in communication by a conduit passing between the first and second chambers that allows exhaust gas to flow from the first chamber to the second chamber, and
   e. the first and second set of spiral shaped tubes are oriented coplanar to each other such that the first and second set of spiral-shaped tubes are coaxially unaligned.

2. The high-efficiency boiler defined in claim 1 wherein the conical portion of the first spiral-shaped tube has a central hub which is open to receive a burner, the conical portion of the second spiral-shaped tube having a hub which is closed off by a steel plate, the steel plate configured to substantially close off an interior space formed in the combustion chamber and distribute flame from the burner.

3. The high-efficiency boiler defined in claim 2 wherein the spiral-shaped tubes in the first chamber have equal outward radial diameters, the inner spiral-shaped tubes being planar and having an inner radial diameter, the outer first and second spiral-shaped tubes having a planer portion with an inner planar diameter equal to the inner radial diameter of the inner spiral-shaped tubes, the outer first and second spiral-shaped tubes have a conical diameter extending inwardly from their inner diameters to their hubs, the inner and outer spiral-shaped tubes being oriented such that the planar portions of the first and second spiral-shaped tubes and the Inner pair of spiral-shaped tubes are coaxially aligned and separated from each other by a gap sufficient for exhaust gas to flow between them.

4. The high-efficiency boiler defined in claim 3 wherein the outer first and second spiral-shaped tubes each have an inner radius extending from a center portion of their hubs to their inner planar diameters and an outer radius extending from the center portion of their hubs to their outward radial diameters, the outer radius being greater than the inner radius.

5. The high-efficiency boiler defined in claim 1 wherein the spiral-shaped tubes in the second chamber comprise parallel flat spiral-shape tubes separated from each other by a gap, the spiral-shaped tubes in the second chamber having an inner and outer radial diameter and a hub, the conduit communicating with the hub of the spiral-shaped tubes in the second chamber, the gap dimensioned to permit exhaust to flow between said spiral-shaped tubes in the second chamber.

6. The high-efficiency boiler defined in claim 4 wherein the spiral-shaped tubes in the second chamber comprise parallel flat spiral-shape tubes separated from each other by a gap, the spiral-shaped tubes in the second chamber having an inner and outer radial diameter and a hub, the conduit communicating with the hub of the spiral-shaped tubes in the second chamber, the gap dimensioned to permit exhaust to flow between said spiral-shaped tubes in the second chamber.

7. The high-efficiency boiler defined in claim 4 wherein the ratio of the inner radius to the outer radius is about 1:2.

8. A high-efficiency boiler comprising:
   a. an air-tight housing having first and second chambers separated by a wall;
   b. the first chamber housing a first plurality of parallel spiral-shaped tubes comprising first and second outer spiral-shaped tubes each having a conical portion and a flat portion surrounding the conical portion, the first and second outer spiral-shaped tubes positioned parallel to each other with their conical portions oriented away from each other to form a combustion chamber between the conical portion of the outer spiral-shaped tubes, the combustion chamber configured to receive a nozzle of a burner projecting therein;

c. the second chamber housing a second plurality of parallel spiral-shaped tubes that are fluidly coupled with the first plurality of parallel spiral-shaped tubes;

d. the first and second chambers being in communication by a conduit passing between the first and second chambers that allows exhaust gas to flow from the first chamber to the second chamber, and e. the first and second plurality of parallel spiral-shaped tubes are oriented coplanar to each other such that the first and second set of spiral-shaped tubes are coaxially unaligned.

9. The high-efficiency boiler defined in claim 8 wherein the first and second outer spiral-shaped tubes have a hub at a center of their conical portions, the hub of the first outer spiral-shaped tube is configured to receive the nozzle of a burner, the hub of the second outer spiral-shaped tube has a wall obstructing the flow of gas through the hub, the flat portions of the first and second outer spiral-shaped tubes being separated sufficiently to permit exhaust gases to flow between them.

10. The high-efficiency boiler defined in claim 9 further comprising a plurality of inner spiral-shaped tubes, the inner spiral-shaped tubes being flat, the inner spiral-shaped tubes being positioned between and parallel with the flat portion of each outer spiral-shaped tube, the inner and outer spiral-shaped tubes being separated from each other by a gap sufficient to permit exhaust gases to flow between them.

11. The high-efficiency boiler defined in claim 10 wherein the second plurality of spiral-shaped tubes each have a hub, the hub of a first outermost spiral-shaped tube in the second plurality of spiral-shaped tubes has a wall obstructing the flow of gas through the hub of said first outermost spiral-shaped tube and the hub of a second outermost spiral-shaped tube in the second plurality of spiral shaped tubes communicates with the conduit.

* * * * *